United States Patent
Kim

(10) Patent No.: US 10,820,398 B2
(45) Date of Patent: Oct. 27, 2020

(54) MOBILE X-RAY APPARATUS AND METHOD OF CONTROLLING POWER IN MOBILE X-RAY APPARATUS

(71) Applicant: SAMSUNG ELECTRONICS CO., LTD., Suwon-si (KR)

(72) Inventor: Myeong-je Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 16/057,263

(22) Filed: Aug. 7, 2018

(65) Prior Publication Data

US 2019/0053363 A1  Feb. 14, 2019

(30) Foreign Application Priority Data

Aug. 14, 2017  (KR) .................. 10-2017-0103205

(51) Int. Cl.
*H02J 7/00* (2006.01)
*H05G 1/54* (2006.01)
*H01M 10/42* (2006.01)

(52) U.S. Cl.
CPC ............... *H05G 1/54* (2013.01); *H02J 7/007* (2013.01); *H02J 7/0029* (2013.01); *H02J 7/0047* (2013.01); *H02J 7/007184* (2020.01); *H01M 10/4257* (2013.01); *H02J 7/00306* (2020.01)

(58) Field of Classification Search
CPC ......... H05G 1/54; H02J 7/0029; H02J 7/0047
USPC ...................................................... 320/135
See application file for complete search history.

(56) References Cited

U.S. PATENT DOCUMENTS

| 4,134,056 | A  | * | 1/1979 | Fukui et al. ...... | H02J 7/007184 |
| | | | | | 320/161 |
| 7,098,627 | B2 | * | 8/2006 | Nishida .................. | H02J 7/0071 |
| | | | | | 320/159 |
| 8,217,628 | B2 | * | 7/2012 | Yang et al. ........... | H02J 7/0031 |
| | | | | | 320/134 |
| 9,595,838 | B2 | * | 3/2017 | Tanabe .................... | H02J 7/025 |
| RE46,369 | E  |   | 4/2017 | Zhu et al. | |
| 9,655,217 | B2 | * | 5/2017 | Recker et al. ............ | H02J 9/02 |
| 10,575,824 | B2 | * | 3/2020 | Jin et al. ................. | A61B 8/462 |

(Continued)

FOREIGN PATENT DOCUMENTS

| JP | 2009-153847 A | 7/2009 |
| JP | 2009-254215 A | 10/2009 |
| JP | 2013-022186 A | 2/2013 |

(Continued)

OTHER PUBLICATIONS

Communication dated Nov. 22, 2018 by the International Searching Authority in counterpart International Patent Application No. PCT/KR2018/009247. (PCT/ISA/220, PCT/ISA/210 & PCT/ISA/237).

*Primary Examiner* — Sun J Lin
(74) *Attorney, Agent, or Firm* — Sughrue Mion, PLLC

(57) ABSTRACT

A mobile X-ray apparatus and a method of controlling power in the mobile X-ray apparatus. According to the mobile X-ray apparatus and the method, the mobile X-ray apparatus includes a battery management system that determines whether a battery is shut down when in a forced charge mode, subsequently determines whether the battery exits an over-discharged state, and then controls a power supply to enter a shutdown mode or a normal charge mode according to results of the determining. Thus, it is possible to safely charge the battery.

20 Claims, 8 Drawing Sheets

(56) References Cited

U.S. PATENT DOCUMENTS

2016/0064776 A1 3/2016 Ro

FOREIGN PATENT DOCUMENTS

| JP | 2015-016388 A | 1/2015 |
| JP | 6103033 B2 | 3/2017 |
| KR | 10-2016-0024603 A | 3/2016 |

* cited by examiner

MOBILE X-RAY APPARATUS AND METHOD OF CONTROLLING POWER IN MOBILE X-RAY APPARATUS

CROSS-REFERENCE TO RELATED APPLICATION

This application is based on and claims priority under 35 U.S.C. § 119 to Korean Patent Application No. 10-2017-0103205, filed on Aug. 14, 2017, in the Korean Intellectual Property Office, the disclosure of which is incorporated by reference herein in its entirety.

BACKGROUND

1. Field

The disclosure relates to mobile X-ray apparatuses including batteries and methods of controlling power in a mobile X-ray apparatus, and more particularly, to mobile X-ray apparatuses including batteries in which shutdown occurs due to over-discharging, and methods of controlling power in a mobile X-ray apparatus.

2. Description of Related Art

X-rays are electromagnetic waves generally having wavelengths of 0.01 to 100 angstroms (Å), and may be widely used, due to their ability to penetrate objects, in medical apparatuses for imaging the inside of a living body or in non-destructive testing equipment for industrial use.

An X-ray apparatus using X-rays may obtain X-ray images of an object by transmitting X-rays emitted from an X-ray source through an object and detecting a difference in intensities of received X-rays via an X-ray detector. The X-ray images may be used to examine an internal structure of an object and diagnose a disease of the object. The X-ray apparatus facilitates observation of an internal structure of an object by using a principle in which penetrating power of an X-ray varies depending on the density of the object and atomic numbers of atoms constituting the object.

As a wavelength of an X-ray decreases, penetrating power of the X-ray increases and an image on a screen becomes brighter.

There are two types of X-ray apparatuses: a general X-ray apparatus affixed to a specific space, and a mobile X-ray apparatus that can be moved around to various locations.

In the mobile X-ray apparatus, an X-ray radiation device is mounted on a movable main body, and a portable X-ray detector is used. Due to this configuration, the mobile X-ray apparatus may perform X-ray imaging in various locations, and is not restricted to a specific place. Such a mobile X-ray apparatus has a battery, and may perform X-ray imaging in places where AC power is not available by using power supplied from the battery.

SUMMARY

Provided are mobile X-ray apparatuses including batteries that are capable of safely charging the batteries in an over-discharge protection mode, and methods of controlling power in the mobile X-ray apparatuses.

Provided are mobile X-ray apparatuses and methods of controlling power in a mobile X-ray apparatus, which are capable of preventing damage from occurring in a battery and a system when forcibly charging the battery that is in an over-discharge protection mode.

Additional aspects will be set forth in part in the description which follows and, in part, will be apparent from the description, or may be learned by practice of the presented embodiments.

In accordance with an aspect of the disclosure, a mobile X-ray apparatus including a power supply configured to supply an operating power includes: a battery; and a battery management system (BMS) configured to determine whether a shutdown occurs in the battery at a second time point that occurs a first time period after a first time point at which the power supply enters a forced (e.g., first) charge mode and determine, if the shutdown does not occur, whether to change the forced charge mode to a normal (e.g., second) charge mode, based on a voltage of the battery at a third time point that occurs a second time period after the second time point.

The BMS may be further configured to determine whether the voltage of the battery at the third time point is greater than or equal to a second voltage that is greater than a first voltage that is a voltage of the battery at the first time point and change, when the voltage of the battery at the third time point is greater than or equal to the second voltage, the forced charge mode to the normal charge mode.

The BMS may be further configured to control the power supply to enter a shutdown mode when the voltage of the battery at the third time point is less than the second voltage.

The BMS may be further configured to measure a first voltage that is a voltage of the battery at the first time point and measure a time from when the power supply enters the forced charge mode.

The BMS may be further configured to determine whether the shutdown occurs, based on the first voltage and the measured time.

The BMS may be further configured to determine that the shutdown occurs when a voltage of the battery at the second time point drops by greater than or equal to an offset value with respect to the first voltage.

The BMS may be further configured to determine that the shutdown occurs when a discharge current flowing from the battery is greater than a charge current flowing to the battery at the second time point.

The BMS may be further configured to control the power supply to enter the forced charge mode when charging power is supplied to the mobile X-ray apparatus while a voltage of the battery corresponds to a voltage in an over-discharge mode.

The BMS may be further configured to control the power supply to terminate the forced charge mode and enter a shutdown mode when it is determined that the shutdown occurs at the second time point The BMS may be further configured to control a value of a forced charge bit to be a value indicating an active state when the power supply enters the forced charge mode. The BMS may be further configured to transmit data indicating that the power supply enters the forced charge mode to a controller.

The mobile X-ray apparatus may further include an X-ray radiation device and a controller configured to control the X-ray radiation device.

The mobile X-ray apparatus may further include a communication interface configured to connect the power supply to the controller, and the BMS may be further configured to transmit, when the power supply enters the forced charge mode, data including a forced charge bit having a value indicating an active state, to the controller via the communication interface.

In accordance with another aspect of the disclosure, a power control method, which is performed by a mobile X-ray apparatus including a power supply that has a battery and a battery management system and is configured to supply an operating power, includes: entering a forced (e.g., first) charge mode for the battery at a first time point; determining whether shutdown occurs in the battery at a second time point that occurs a first time period after the first time point; and determining, when the shutdown does not occur, whether to change the forced charge mode to a normal (e.g., second) charge mode, based on a voltage of the battery at a third time point that occurs a second time period after the second time point.

In accordance with another aspect of the disclosure, a non-transitory computer-readable recording medium has recorded thereon a program including computer-executable instructions for executing a power control method performed by a mobile X-ray apparatus including a power supply that has a battery and a BMS and is configured to supply an operating power. The power control method includes: entering a forced (e.g., first) charge mode for the battery at a first time point; determining whether shutdown occurs in the battery at a second time point that occurs a first time period after the first time point; and determining, when the shutdown does not occur, whether to change the forced charge mode to a normal (e.g., second) charge mode, based on a voltage of the battery at a third time point that occurs a second time period after the second time point.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
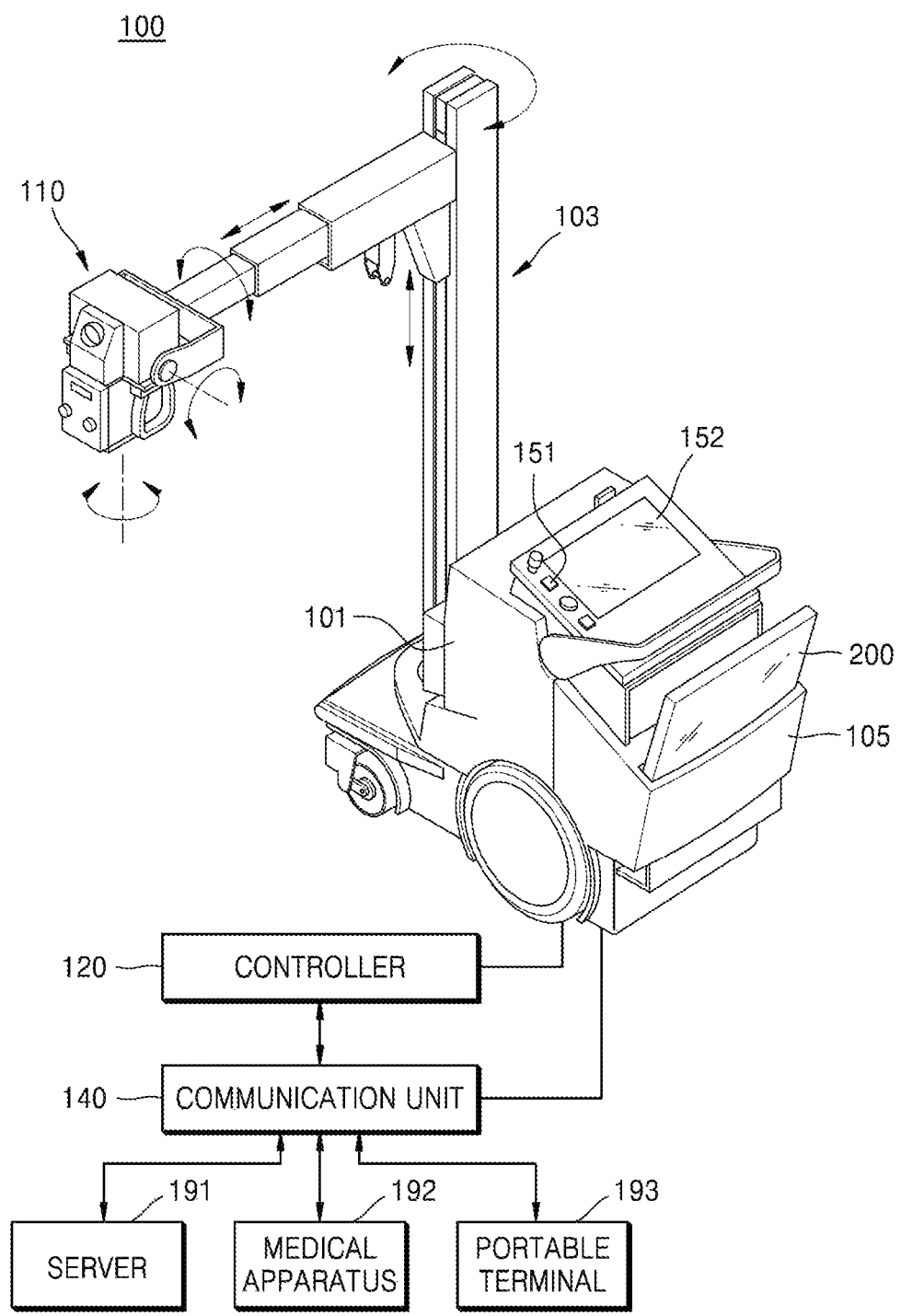
FIG. 1 is an external view and a block diagram of an X-ray apparatus implemented as a mobile type.

The present specification describes principles of the present disclosure and sets forth embodiments thereof to clarify the scope of the present disclosure and to allow those of ordinary skill in the art to implement the embodiments. The present embodiments may have different forms and should not be construed as being limited to the descriptions set forth herein Like reference numerals refer to like elements throughout. The present specification does not describe all components in the embodiments, and common knowledge in the art or the same descriptions of the embodiments will be omitted below. The term "part" or "portion" used herein may be implemented using hardware or software, and according to embodiments, a plurality of "parts" or "portions" may be formed as a single unit or element, or one "part" or "portion" may include a plurality of units or elements. Hereinafter, the operating principles and embodiments of the disclosure will be described in detail with reference to the accompanying drawings.

Furthermore, in the present specification, an "object" may be a target to be imaged and may include a human, an animal, or a part of a human or animal. For example, the object may include a body part (an organ, tissue, limb, etc.) or a phantom.

FIG. 1 is an external view and block diagram of an X-ray apparatus 100 implemented as a mobile type, according to an embodiment.

Referring to FIG. 1, the X-ray apparatus 100 includes an X-ray radiation device 110 for generating and emitting X-rays, an input device 151 for receiving a command from a user, a display 152 for providing information to the user, a controller 120 for controlling the X-ray apparatus 100 according to the received command, and a communication unit 140, i.e., a communication device or interface, for communicating with an external device.

The X-ray radiation device 110 may include an X-ray source for generating X-rays and a collimator for adjusting a region irradiated with the X-rays generated by the X-ray source.

When the X-ray apparatus 100 is implemented as a mobile X-ray apparatus, a main body 101 connected to the X-ray radiation device 110 is freely movable (via wheels, for example), and an arm 103 connecting the X-ray radiation device 110 and the main body 101 to each other is rotatable and linearly movable. Thus, the X-ray radiation device 110 may be moved freely in a three-dimensional (3D) space.

The input device 151 may receive commands for controlling imaging protocols, imaging conditions, imaging timing, and locations of the X-ray radiation device 110. The input device 151 may include buttons, switches, a keyboard, a mouse, a touch screen, a microphone, a voice recognizer, etc.

The display 152, which may be a touch screen display, may display a screen for guiding a user's input, an X-ray image, a screen for displaying a state of the X-ray apparatus 100, and the like.

The controller 120 may control imaging conditions and imaging timing of the X-ray radiation device 110 according to a control command input by the user and generate a medical image based on image data received from an X-ray detector 200. The controller 120 may control a position or orientation of the X-ray radiation device 110 according to imaging protocols and a position of an object.

The controller 120 may include a memory configured to store programs for performing the operations of the X-ray apparatus 100 and a processor or a microprocessor configured to execute the stored programs. The controller 120 may include a single processor or a plurality of processors or microprocessors. When the controller 120 includes the plurality of processors, the plurality of processors may be integrated onto a single chip, to constitute a multi-core processor, or be physically separated from one another.

A holder 105 may be formed on the main body 101 to accommodate the X-ray detector 200. A charging terminal may be disposed in the holder 105 to charge the X-ray detector 200. Thus, the holder 105 may be used to accommodate and to charge the X-ray detector 200.

The input device 151, the display 152, the controller 120, and the communication unit 140 may be provided on the main body 101. Image data acquired by the X-ray detector 200 may be transmitted to the main body 101 for image processing, and then the resulting image may be displayed on the display 152 or transmitted to an external device via the communication unit 140.

The controller 120 and the communication unit 140 may be separate from the main body 101, or only some components of the controller 120 and the communication unit 140 may be provided on the main body 101.

The X-ray apparatus 100 may be connected to external devices such as a server 191, a medical apparatus 192, and/or a portable terminal 193 (e.g., a smartphone, a tablet PC, or a wearable device) in order to transmit or receive data via the communication unit 140.

The communication unit 140 may include at least one component that enables communication with an external device. For example, the communication unit 140 may include at least one of a local area communication module, a wired communication module, and a wireless communication module. The communication module may include Wi-Fi circuitry, Bluetooth circuitry, or other types of communication circuitry.

The communication unit 140 may receive a control signal from an external device and transmit the received control signal to the controller 120 so that the controller 120 may control the X-ray apparatus 100 according to the received control signal.

Alternatively, by transmitting a control signal to an external device via the communication unit 140, the controller 120 may control the external device according to the transmitted control signal. For example, the external device may process data according to a control signal received from the controller 120 via the communication unit 140.

The communication unit 140 may further include an internal communication module that enables communications between components of the X-ray apparatus 100. A program for controlling the X-ray apparatus 100 may be installed on the external device and may include instructions for performing some or all of the operations of the controller 120.

The program may be preinstalled on the portable terminal 193, or a user of the portable terminal 193 may download the program from a server providing an application for installation. The server for providing an application may include a recording medium having the program recorded thereon.

Furthermore, the communication unit 140 may further include an internal communication module that enables communications between components of the X-ray apparatus 100.

Figure 2:
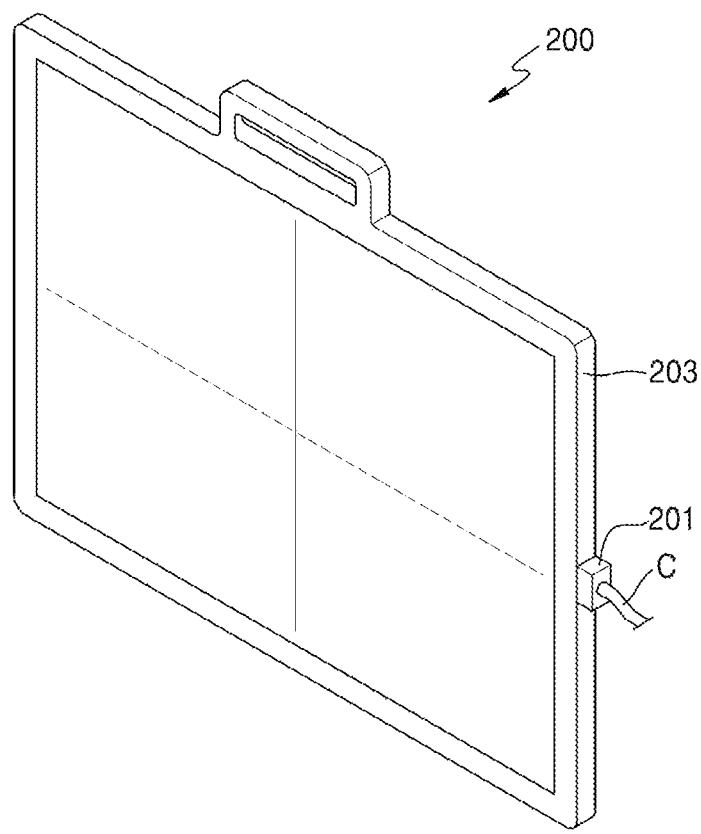
FIG. 2 is an external view of an X-ray detector.

FIG. 2 is an external view of the X-ray detector 200 implemented as a portable type.

As described above, the X-ray detector 200 used in the X-ray apparatus 100 may be implemented as a portable X-ray detector. The X-ray detector 200 may be equipped with a battery for supplying power to operate wirelessly, or as shown in FIG. 2, may operate by connecting a charge port 201 to a separate power supply via a cable C.

A case 203 maintains an external appearance of the X-ray detector 200 and has therein a plurality of detecting elements for detecting X-rays and converting the X-rays into image data, a memory for temporarily or permanently storing the image data, a communication module for receiving a control signal from the X-ray apparatus 100 or transmitting the image data to the X-ray apparatus 100, and a battery. Further, image correction information and intrinsic identification (ID) information of the X-ray detector 200 may be stored in the memory, and the stored ID information may be transmitted together with the image data during communication with the X-ray apparatus 100.

Figure 3:
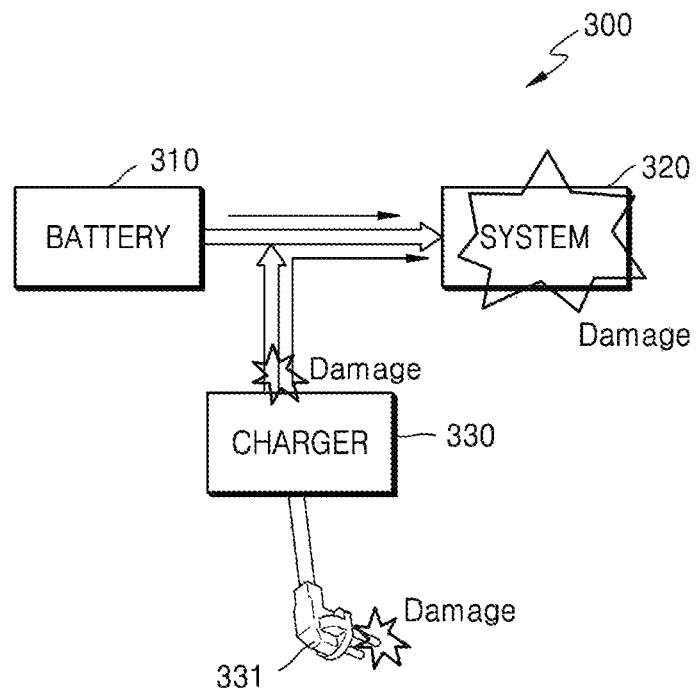
FIG. 3 is a schematic block diagram of a mobile X-ray apparatus.

FIG. 3 is a schematic block diagram of a mobile X-ray apparatus 300. Since the mobile X-ray apparatus 300 of FIG. 3 corresponds to the X-ray apparatus 100 described with reference to FIG. 1, descriptions that are provided above with respect to FIG. 1 will be omitted here for the sake of brevity.

Referring to FIG. 3, the mobile X-ray apparatus 300 may include a battery 310 included in a power supply (not shown), a system 320, and a charger 330.

The battery 310 may supply operating power necessary for X-ray imaging to at least one component included in the mobile X-ray apparatus 300, so that the mobile X-ray apparatus 300 may perform the X-ray imaging without having to be fixed in a specific place.

In this case, the battery 310 may be a rechargeable battery that can be charged and reused repeatedly. Furthermore, the battery 310 may be placed inside a main body 101.

The system 320 refers to components necessary for performing X-ray imaging, which include a controller 120 and an X-ray radiation device 110. The system 320 may receive operating power necessary for performing X-ray imaging from the battery 310.

The charger 330 may charge the battery 310. In detail, the charger 330 may supply a charging power to charge the battery 310. In this case, the charging power may be a power generated by the charger 330.

In detail, the charger 330 may be combined with an external power supply (not shown) to receive power from the external power supply (e.g., a wall power supply or fixed electrical outlet). The charger 330 may then control the received power according to a user input or algorithmic operations performed within the mobile X-ray apparatus 300, to supply a charging power to the battery 310.

For example, the charger 330 may include a power plug 331 and be combined with an outlet (not shown) of a wall power supply (not shown) via the power plug 331. When the power plug 331 of the charger 330 is coupled to the outlet of the wall power supply, the charger 330 may receive a charging power from the wall power supply. Then, the battery 310 may use the received charging power to recharge and restore a discharged power.

In the mobile X-ray apparatus 300, when the charger 330 receives a charging power, the battery 310 will be automatically charged. In other words, the battery 310 starts to be charged immediately when the power plug 331 of the charger 330 is connected to the wall power supply.

However, in the case wherein the system 320 is damaged so that a short occurs therein, the charger 330 and the wall power supply as well as the battery 310 may also undergo damage when the power plug 331 of the charger 330 is coupled to the outlet of the wall power supply to charge the battery 310.

In general, when the power plug 331 of the charger 330 is coupled to the outlet of the wall power supply, power supplied via the power plug 331 is transmitted to both the battery 310 and the system 320. However, when a short occurs in the system 320, an overcurrent flows from the charger 330 to the system 320 such that power is not supplied to the battery 310. Thus, a charge current is not transmitted to the battery 310. Furthermore, since the short occurs in the system 320, which causes the current to flow out of the battery 310 and into the system 320, an overcurrent flows from the battery 310 to the system 320. Thus, as a result of comparing a charge current and a discharge current respectively flowing into and out of the battery 310, the discharge current flowing from the battery 310 to the system 320 is greater than the charge current flowing from the charger 330 to the battery 310.

As described above, when the short occurs in the system 320, an overload may be placed on the charger 330 as an overcurrent is continuously supplied from the charger 330 to the system 320. When the overload is placed on the charger 330 for more than a predetermined time, damage such as breakage of the charger 330 may occur. Furthermore, when the charger 330 remains connected to the wall power supply despite being broken down, the wall power supply may also be damaged.

Furthermore, when the system 320 is shorted out so that an overcurrent is continuously transmitted from the battery 310 to the system 320, the battery 310 may be over-discharged. In this case, an over-discharge is a situation where a voltage of the battery 310 drops to less or equal to a specific value such as an over-discharge protection voltage, such that the amount of discharge is greater than or equal to a nominal battery capacity. When a rechargeable battery is over-discharged, sulfation occurs in electrodes of the rechargeable battery, thereby resulting in impaired reversibility of charging-discharging. In other words, when the battery 310 is over-discharged, such over-discharging may impair the durability/lifetime of the battery 310, causing the battery 310 to become un-reusable. To prevent damage due to over-discharging, when a voltage of the battery 310 drops to less than or equal to an over-discharge protection voltage, the mobile X-ray apparatus 300 may control the battery 310 to be shut down. When the battery 310 is shut down, a charge path for supplying power to the battery 310 and a discharge path for supplying power via the battery 310 are both shut off so that charging of the battery 310 cannot be attempted.

Thus, when the battery 310 is over-discharged as described above, like in the case wherein the system 320 is damaged, there is a need for an apparatus and method of controlling power, which are capable of safely charging the battery 310 even when damage is likely to occur to at least one of the battery 310, the system 320, and the charger 330.

A mobile X-ray apparatus and a method of controlling power in the mobile X-ray apparatus according to embodiments, which are capable of safely charging the battery 310 even when the battery 310 is over-discharged, will be described in more detail below with reference to FIGS. 4 through 9.

Figure 4:
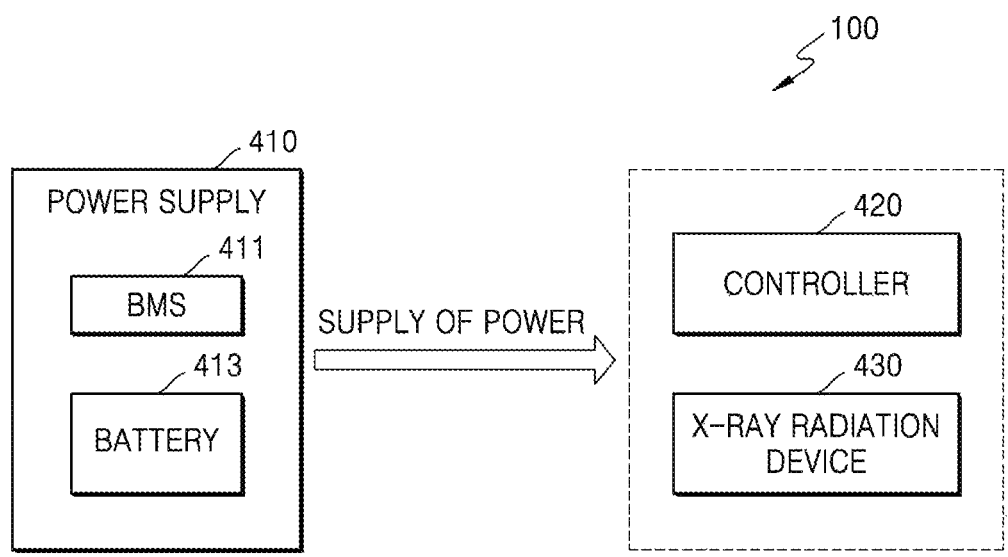
FIG. 4 is a block diagram of a mobile X-ray apparatus according to an embodiment.

FIG. 4 is a block diagram of a mobile X-ray apparatus 400 according to an embodiment.

The mobile X-ray apparatus 400 according to the present embodiment may correspond to the mobile X-ray apparatus 100 described with reference to FIG. 1. Thus, descriptions that are provided above with respect to the X-ray apparatus 100 of FIG. 1 will be omitted herein.

Referring to FIG. 4, the mobile X-ray apparatus 400 includes a power supply 410 configured to supply operating power. The power supply 410 includes a battery management system (BMS) 411 and a battery 413.

According to an embodiment, the BMS 411 determines whether a shutdown occurs in the battery 413 at a second time point that occurs a first time period after a first time point at which the power supply 410 enters a forced charge mode for the battery 413. When the shutdown does not occur in the battery 413, the BMS 411 determines whether to change the forced charge mode to a normal charge mode based on a voltage of the battery 413 at a third time point that occurs a second time period after the second time point.

In this case, the forced charge mode is an operating mode in which an exception process for an over-discharge protection mode is performed such that a charge path and a discharge path are respectively connected. In other words, the forced charge mode refers to an operating mode in which charging of the battery 413 proceeds while a state of the battery 413 corresponds to an over-discharge protection mode.

The over-discharge protection mode is an operating mode in which a charge path and a discharge path are shut off to prevent damage due to over-discharging of the battery 413. A normal charge mode means an operating mode in which a charge path and a discharge path are respectively connected so that a general charging operation may be performed when a voltage of the battery 413 is higher than or equal to an over-discharge protection level.

An operation of the BMS 411 will be described in more detail below with reference to FIGS. 5A through 7.

The mobile X-ray apparatus 400 may further include an X-ray radiation device 430 and a controller 420. The mobile X-ray apparatus 400 of FIG. 4 may be implemented as the mobile X-ray apparatus described with reference to FIG. 1, and includes only components related to the present embodiment. Thus, the mobile X-ray apparatus 400 may further include components described with reference to FIG. 1, other than those shown in FIG. 4. For example, the mobile X-ray apparatus may further include at least one of a high voltage generator (not shown), the input device 151, the display 152, and the communication unit 140.

Furthermore, since the X-ray radiation device 430 and the controller 420 may respectively correspond to the X-ray radiation device 110 and the controller 120 described with reference to FIG. 1, detailed descriptions thereof will be omitted herein.

The X-ray radiation device 430 is configured to generate X-rays and emit the X-rays toward an object, and may include an X-ray source for generating X-rays and a collimator for adjusting a region irradiated with the X-rays generated by the X-ray source.

The controller 420 may control all operations of the mobile X-ray apparatus 400. In detail, to perform operations necessary for X-ray imaging, the controller 420 may control operations of components included in the mobile X-ray apparatus 400. For example, the controller 420 may control imaging timing, imaging conditions, etc. of the X-ray radiation device 430 according to a control command input by the user and generate a medical image based on image data received from the X-ray detector (200 of FIG. 1). Furthermore, the controller 420 may control a position or orientation of the X-ray radiation device 430 according to imaging protocols and a position of an object.

The controller 420 may include a memory configured to store programs for performing the above operations as well as operations thereof that will be described below and a processor configured to execute the stored programs.

The power supply 410 may supply operating power necessary for X-ray imaging to at least one component included in the mobile X-ray apparatus 400, such as the controller 420 and the X-ray radiation device 430, so that the mobile X-ray apparatus 400 may perform the X-ray imaging without regard to a place.

The power supply 410 including the battery 413 and the BMS 411 may be positioned inside the main body (101 of FIG. 1).

The battery 413 may be a lithium ion battery that includes an anode, a cathode, and an electrolyte. In detail, the lithium ion battery may be formed as a cell string with a plurality of battery cells connected in series. It is hereinafter assumed that the battery 413 is a lithium ion battery.

In the lithium ion battery, lithium cobalt oxide ($LiCoO_2$) or lithium iron phosphate ($LiFePO_4$) may be used for the anode, and graphite may be used for the cathode. The lithium ion battery may include a combination of a plurality of battery cells connected to one another. For example, the lithium ion battery may include a total of three hundred and fifty-two (352) cells, i.e., a serial connection of 88 cells and a parallel connection of 4 cells.

Furthermore, the lithium ion battery may be suitable for use in a mobile X-ray apparatus due to its smaller size and lighter weight than lead-acid batteries that have been generally used. For example, since a total weight of the power supply 410 including the lithium ion battery and a peripheral circuit may be 33.2 kg, the total weight may be less than 35 kg, which is the maximum allowable gross weight for carrying on an aircraft. Thus, the power supply 410 may be transported by air as a single component.

The power supply 410 may supply, via the battery 413, operating power to the X-ray radiation device 430 and the controller 420. Furthermore, the power supply 410 may supply, via the battery 413, operating power to components of the mobile X-ray apparatus 400 that require the operating power. For example, the power supply 410 may supply operating power to the input device 151, the display 152, and the communication unit 140 of the mobile X-ray apparatus 400 via the battery 413.

The BMS 411 may detect a state of the battery 413, such as a voltage and a temperature thereof. According to an embodiment, the BMS 411 may include a battery stack monitor circuit designed to monitor a voltage of the battery 413 and a temperature of a battery cell. The battery stack monitor circuit may also monitor the current of the battery 413. The BMS 411 may control and manage the power supply 410 based on the state of the battery 413.

When the battery 413 includes a plurality of battery cells, a voltage measured in one battery cell is referred to as a 'battery cell voltage', and a voltage of the battery 413 that is a voltage generated by all the battery cells is referred to as a 'battery voltage'. When controlling and managing the power supply 410 based on a voltage of the battery 413, the BMS 411 may measure and use either a battery voltage or a battery cell voltage as the voltage of the battery 413.

Furthermore, the BMS 411 may operate a protection circuit to protect the battery 413 based on the state of the battery 413. In other words, the BMS 411 may operate, based on the state of the battery 413, the protection circuit to prevent dangerous conditions of or possibility of damage to the battery 413. In detail, based on the state of the battery 413, the BMS 411 may operate the protection circuit protecting against at least one of over-discharge, overcurrent, overheating, and unbalancing between battery cells. In this case, the protection circuit may mean at least one of an apparatus, a module, and a program operating to prevent the dangerous conditions of or the possibility of damage to the battery 413.

For example, the BMS 411 may operate the protection circuit when the battery 413 is in an over-discharged state where a voltage of the battery 413 is lower than a reference voltage.

For example, a shutdown circuit may be used as the protection circuit for preventing damage to the battery 413 due to over-discharging. The shutdown circuit may include a circuitry that turns on or off a discharge path (not shown) for supplying power to other components via the battery 413. Furthermore, the shutdown circuit may include a circuitry that turns on or off a charge path (not shown) for supplying a charging power to the battery 413.

When the battery 413 is in an over-discharged state, the BMS 411 may drive the shutdown circuit such that the charge path and the discharge path are respectively cut off, to prevent the battery 413 from being further discharged.

For example, when a voltage of the battery 413 drops to less than or equal to 275 V, the BMS 411 may turn itself off by operating the shutdown circuit that is the protection circuit. When a battery cell voltage drops to less than or equal to 3 V, the BMS 411 may determine that the battery 413 is over-discharged and operate the protection circuit.

Furthermore, the BMS 411 may operate the protection circuit when the battery 413 is in an overcurrent state where a current of the battery 413 is higher than a reference value. For example, when a current of a lithium ion battery is greater than or equal to 40 A, the BMS 411 may operate the shutdown circuit to turn itself off.

The BMS 411 may also operate the protection circuit when the battery 413 is in an overheated state where a temperature of the battery 413 is higher than a reference value. For example, when a temperature of the lithium ion battery is greater than or equal to 70° C., the BMS 411 may operate the protection circuit to turn itself off.

Furthermore, when the battery 413 is unbalanced between cells in the battery 413, the BMS 411 may operate the protection circuit. For example, when a voltage difference between cells in the lithium ion battery remains greater than or equal to 0.5 V for ten (10) seconds or more, the BMS 411 may operate a shutdown circuit to turn itself off. As another example, when a difference between maximum and minimum voltages of cells in the lithium ion battery remains greater than or equal to 0.5 V for 10 seconds or more, the BMS 411 may operate a shutdown circuit to turn itself off.

As another example, when at least one of over-discharging, overcurrent, overheating, and unbalancing between battery cells occurs based on the state of the battery 413, the BMS 411 may shut off, before operating the protection circuit, a charge path and/or a discharge path via a charge controller (not shown) for controlling the charge path and/or a discharge controller for controlling the discharge path. The charge controller may include at least one charge field-effect transistor (FET), and the discharge controller may include at least one discharge FET. An operation in which the BMS 411 controls charging or discharging of the battery 413 by controlling the charge path and/or discharge path will be described in more detail below with reference to FIGS. 5A through 7.

Figure 7:
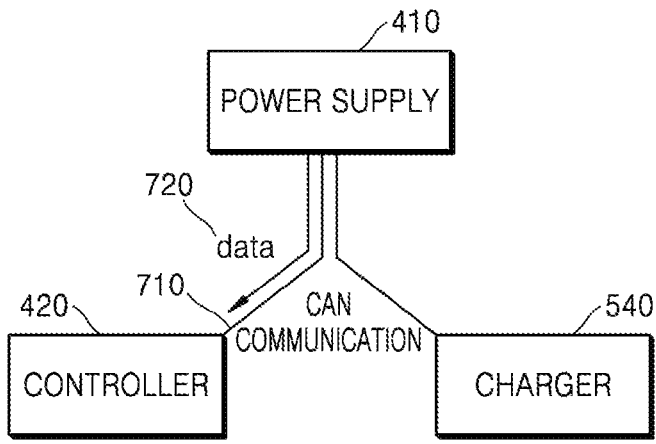
FIG. 7 is a diagram for illustrating a communication protocol used in a mobile X-ray apparatus, according to an embodiment.

The power supply 410, a charger (540 of FIG. 5A and FIG. 7), and the controller 420 may each include a communication interface that enables communication therebetween. For example, the power supply 410, the charger 540, and the controller 420 may communicate with one another via their communication interfaces according to a controller area network (CAN) protocol, as shown in FIG. 7. As another example, communications may be performed among the power supply 410, the charger 540, and the controller 420 by using a high-speed digital interface such as low voltage differential signaling (LVDS), an asynchronous serial communication protocol such as a universal asynchronous receiver transmitter (UART), a low-latency network protocol such as an error synchronous serial communication protocol, or other various communication methods that are obvious to those of ordinary skill in the art.

Furthermore, the power supply 410, the charger 540, and the controller 420 may each be constituted by a different module.

When the X-ray radiation device 430 emits X-rays, a high voltage needs to be applied to the X-ray radiation device 430. Furthermore, the high voltage applied to the X-ray radiation device 430 may be monitored by the power supply 410. Since power supply 410, the charger 540, and the controller 420 are each constituted by a different module, the controller 420 does not need to directly monitor a high voltage. Thus, a high voltage circuit is not needed within the controller 420. This may consequently reduce the risks associated with the high voltage circuit, thereby effectively improving stability.

Furthermore, since the power supply 410, the charger 540, and the controller 420 are each constituted by a different module, they may be independently used for different mobile X-ray apparatuses.

When the power supply 410, the charger 540, and the controller 420 are each composed of a different module, by applying a shield case to each of the power supply 410, the charger 540, and the controller 420, it is possible to suppress Electro Magnetic Interference (EMI)/Electro Magnetic Compatibility (EMC) noise that may occur therebetween. The shield case may be composed of a metallic material.

Figure 5A:
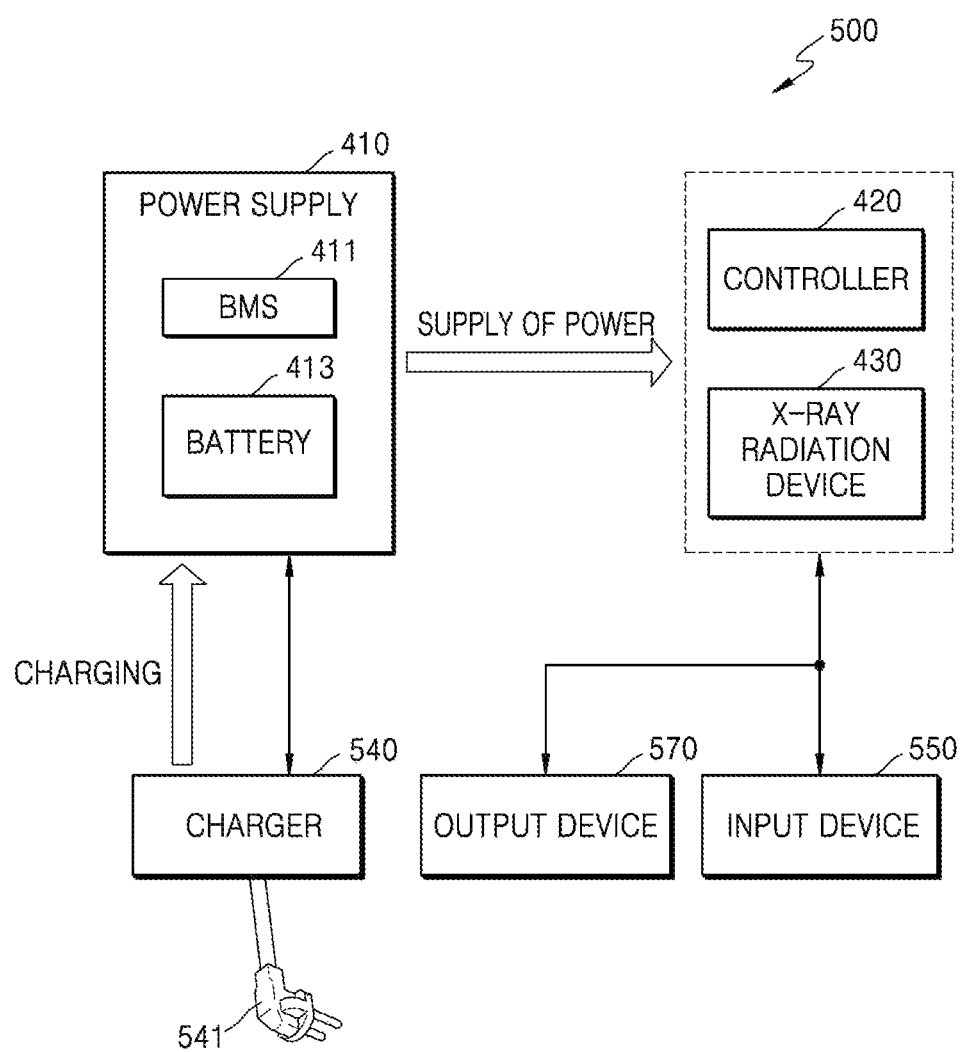
FIG. 5A is a block diagram of a mobile X-ray apparatus according to another embodiment.

FIG. 5A is a block diagram of a mobile X-ray apparatus 500 according to another embodiment.

The mobile X-ray apparatus 500 of FIG. 5A may correspond to the mobile X-ray apparatus 400 of FIG. 4. Thus, the same components of the mobile X-ray apparatus 500 as those of the mobile X-ray apparatus 400 shown in FIG. 4 are denoted by the same reference numerals. Thus, descriptions that are provided above with respect to the mobile X-ray apparatus 400 of FIG. 4 will be omitted here.

Unlike the mobile X-ray apparatus 400, the mobile X-ray apparatus 500 may further include at least one of the charger 540, an input device 550, and an output device 570.

The charger 540 may correspond to the charger 330 described with reference to FIG. 3. Thus, descriptions that are provided above with respect to the charger 330 will be omitted here.

The charger 540 may charge a battery 413. In detail, the charger 540 may supply a charging power to charge the battery 413. The charger 540 may be connected by wire or wirelessly to the power supply 410 and may accordingly supply power to the battery 413 through a wired or wireless connection.

The charger 540 may be combined with an external power supply such as a wall power supply to receive power from the external power supply. The charger 540 may also control the received power according to a user input or arithmetic operations performed within the mobile X-ray apparatus 500, to supply a charging power to the battery 413.

The charger 540 includes a power plug 541 and may be combined with an outlet (not shown) of a wall power supply (not shown) via the power plug 541. When the power plug 541 of the charger 540 is coupled to the outlet of the wall power supply, the charger 540 may receive a charging power from the wall power supply. Then, the battery 413 may use the received charging power to recharge and restore a discharged power.

The input device 550 may receive at least one of a command and data from the user. In detail, the input device 550 may correspond to the input device 151 described with reference to FIG. 1 and include buttons, switches, a keyboard, a mouse, a touch screen, a voice recognizer, etc.

According to an embodiment, when a voltage of the battery 413 drops to less than or equal to an over-discharge protection voltage, a BMS 411 controls the power supply 410 to enter an over-discharge protection mode.

The input device 550 may receive a user input for requesting a wake up operation. In this case, the wake up operation refers to an operation in which the power supply 410 that has entered an over-discharge protection mode disables the over-discharge protection mode so that a charge path and a discharge path are respectively connected. When the user input for requesting a wake up operation is received, the BMS 411 may change an operating mode of the power supply 410 to a forced charge mode.

The output device 570 outputs predetermined information in the form of at least one of a displayed indicator, a sound, or tactile feedback so that the user may recognize the predetermined information via at least one of a tactile sense, a visual sense, and an auditory sense. The output device 570 may include the display 152 described with reference to FIG. 1. Alternatively, the output device 570 may include a speaker (not shown) for outputting an audio signal.

When the output device 570 includes the display 152, the display 152 may display a screen for guiding a user input, an X-ray image, a screen for displaying a state of the mobile X-ray apparatus 500, etc.

According to an embodiment, the display 152 included in the output device 570 may output a user interface screen indicating a current operating mode of the power supply 410 controlled by the BMS 411. For example, the display 152 included in the output device 570 may output a screen indicating whether a current operating mode of the power supply 410 is a forced charge mode, an over-discharge protection mode, or a normal charge mode.

Figure 5B:
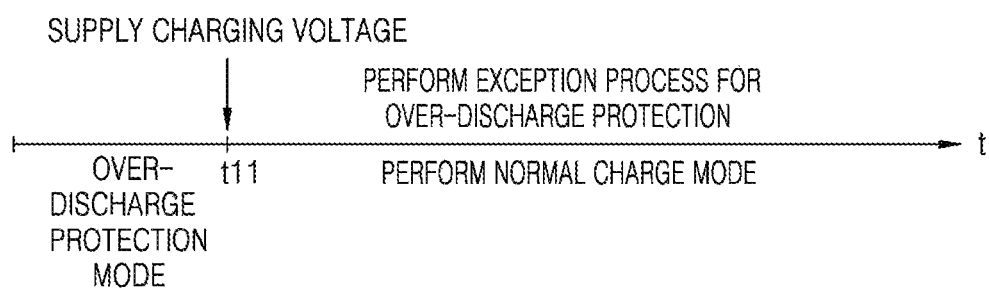
FIG. 5B is a diagram for illustrating a charging operation of a general mobile X-ray apparatus.

FIG. 5B is a diagram for explaining a charging operation of a general mobile X-ray apparatus.

When a voltage of a battery drops to less than or equal to an over-discharge protection voltage, the general mobile X-ray apparatus enters an over-discharge protection mode. Referring to FIG. 5B, when a power plug of a charger is coupled to an outlet of a wall power supply at time point t11, a charging power starts to be supplied to a power supply. FIG. 5B shows an example in which the power supply is in an over-discharge protection mode before the time point t11.

When the charging power is supplied to the power supply at the time point t11, the general mobile X-ray apparatus controls the power supply to enter a charge mode after the time point t11 by unconditionally performing an exception process for over-discharge protection. In other words, the general mobile X-ray apparatus respectively connects a charge path and a discharge path that have been cut off due to over-discharge protection. Thereby, the charge path and the discharge path respectively become connected so that a charging voltage may be transmitted to the battery.

However, over-discharging may occur due to damage to a system as described with reference to FIG. 3. In this case, when a charge mode is entered to charge a battery without recovering the damaged system, additional damage may occur in at least one of the battery, the system, and the charger.

Figure 5C:
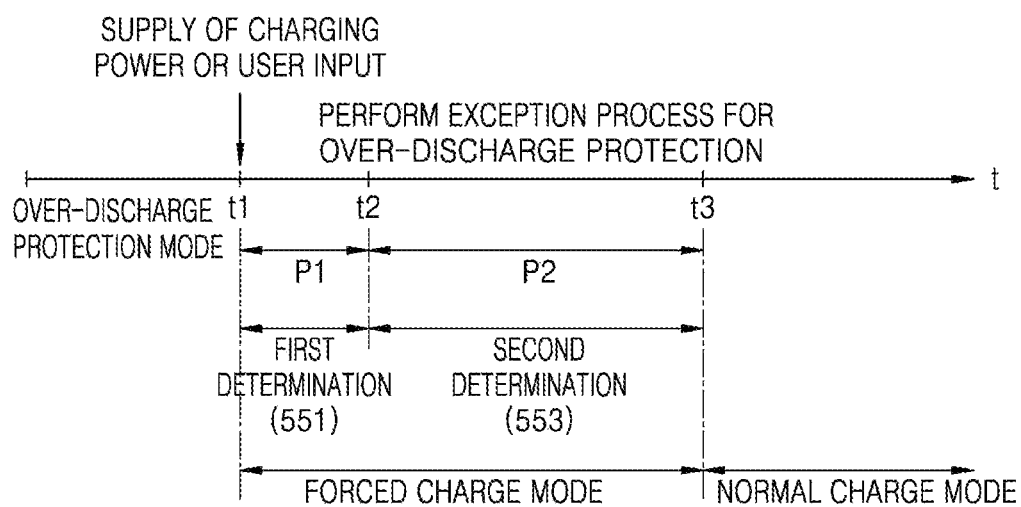
FIG. 5C is a diagram for illustrating a charging operation of a mobile X-ray apparatus according to an embodiment.

FIG. 5C is a diagram for explaining a charging operation of a mobile X-ray apparatus according to an embodiment. A charging operation of the mobile X-ray apparatus 500 of FIG. 5A will now be described with reference to FIGS. 5A and 5C.

When a voltage of the battery 413 corresponds to a voltage in an over-discharge mode and a charging power is supplied to the mobile X-ray apparatus 500, the BMS 411 may control the power supply 410 to enter a forced charge mode. Alternatively, when a user input for requesting a wake up operation is received via the input device 550, the BMS 411 may control the power supply 410 to enter the forced charge mode. In other words, the battery 413 may go into the forced charge mode according to supply of a charging power or a user input for requesting a wake up operation.

Referring to FIG. 5C, the mobile X-ray apparatus 500 according to the embodiment receives a charging power via the charger 540 at time point t1. Alternatively, a user input for requesting a wake up operation may be received via the input device 550 at time point t1. In this case, the wake up operation refers to an operation in which the power supply 410 that has entered an over-discharge protection mode disables the over-discharge protection mode so that a charge path and a discharge path are respectively connected. In other words, the wake up operation means an operation in which the power supply 410 that has entered an over-discharge protection mode changes its operating mode to a forced charge mode.

The wake up operation may be performed when the power plug 541 of the charger 540 is coupled to an outlet of a power supply (e.g., a wall power supply) or when a user input for requesting the wake up operation is received via the input device 550.

An example in which the mobile X-ray apparatus 500 performs a wake up operation to enter a forced charge mode when a charging power is supplied will now be described.

Referring to FIG. 5C, the BMS 411 of the mobile X-ray apparatus 500 respectively enters an over-discharge protection mode and a forced charge mode before and after the time point t1.

Time points t1, t2, and t3 shown in FIG. 5C are hereinafter referred to as first, second, and third time points t1, t2, and t3, respectively.

The BMS 411 determines whether shutdown occurs in the battery 413 at the second time point t2 that occurs a first time period P1 after the first time point t1 at which the power supply 410 enters a forced charge mode for the battery 413. When the shutdown does not occur in the battery 413, the BMS 411 then determines whether to change the forced charge mode to a normal charge mode based on a voltage of the battery 413 at the third time point t3 that occurs a second time period P2 after the second time point t2. And, a voltage of the battery 413 at the first time point t1 or a voltage of a cell in the battery 413 is hereinafter referred to as a first voltage. In this case, a second voltage is greater than the first voltage. Furthermore, the second voltage may be set to a value that is greater than an over-discharge protection voltage and has a specific margin with respect thereto.

In detail, the BMS 411 may determine whether the battery 413 is being normally charged during the first time period P1 after entering the forced charge mode. The BMS 411 may measure a current flowing across the battery 413 and a voltage of the battery 413 and determine whether the battery 413 is being normally charged with a charging power supplied during the first time period P1 based on the measured current and voltage of the battery 413.

Determination as to whether the battery 413 is being normally charged during the first time period P1 is hereinafter referred to as first determination 551.

In detail, the BMS 411 measures a power of the battery 413 at the first time point t1. A voltage of the battery 413 at the first time point t1 or a voltage of a cell in the battery 413 is hereinafter referred to as a first voltage.

To count a time starting with the first time point t1, the BMS 411 may also measure the time from when a forced charge mode is entered. In other words, the BMS 411 starts to measure the time from the time point t1. The BMS 411 may determine whether shutdown occurs in the battery 413 based on the first voltage and the measured time. Alternatively, when a discharge current is greater than a charge current at the second time point t2, the BMS 411 may determine that the shutdown has occurred in the battery 413.

In detail, when a voltage of the battery 413 drops by greater than or equal to an offset value with respect to the first voltage at the second time point t2, the BMS 411 may determine that shutdown has occurred in the battery 413.

Since a voltage of a cell in the battery 413 remains less than or equal to an over-discharge protection voltage up until the first time point t1, the power supply 410 is in an over-discharge protection mode before the first time point t1 and goes into a forced charge mode after the first time point t1.

When shutdown has not occurred in the battery 413 up until the first time point t1, the power supply 410 enters a forced charge mode to supply a charging power to the battery 413. In this case, since the battery 413 starts to be normally charged, the voltage of the battery 413 increases gradually in proportion to the charging power. Otherwise, when the shutdown occurs in the battery 413 due to over-discharging, the battery 413 may not be charged normally even when a charging power is supplied thereto, and the voltage of the battery 413 may not increase normally.

Furthermore, when a system including the controller 420 and/or the X-ray radiation device 430 is shorted to over-discharge the battery 413, shutdown may occur in the battery 413. In this case, even when the battery 413 receives a charging power, a discharge current flowing out of the battery 413 may become greater than a charge current being supplied to the battery 413. When the discharge current is greater than the charge current, the battery 413 cannot be charged, and may accordingly be over-discharged to a greater degree.

Thus, the BMS 411 may monitor at least one of a voltage and a current of the battery 413 during the first time period P1 after entering the forced charge mode and determine whether the battery 413 is normally being charged.

In this case, the first time period P1 is the amount of time required to determine whether the battery 413 is being normally charged in proportion to a charging power and may vary depending on a specification and a model of the battery 413, a value of the charging power supplied to the battery 413, a degree to which the battery 413 is discharged, etc. The BMS 411 may determine the first time period P1 by taking into account the specification and model of the battery 413, the value of the charging power supplied to the battery 413, the degree to which the battery 413 is discharged, etc. Alternatively, the user may determine an experimentally optimal value as the first time period P1 by taking into account the specification and model of the battery 413, the value of the charging power supplied to the battery 413, the degree to which the battery 413 is discharged, etc.

For example, an over-discharge protection voltage of one cell in the battery 413 may be 3V, and the first voltage that is a voltage of the battery 413 and, in particular, a voltage of a cell in the battery 413 may be 2.9 V. Furthermore, the first and second time periods P1 and P2 may respectively be set to 20 seconds and 5 minutes 40 seconds. An offset value and a second voltage may respectively be set to 2 V and 3.3 V. In this case, the BMS 411 may determine whether a voltage drop of greater than or equal to the offset value of 2 V with respect to the first voltage of 2.9 V occurs after the first time period P1 of 20 seconds elapses from the first time point t1 at which the forced charge mode is entered. When this voltage drop occurs, the BMS 411 may determine that shutdown has occurred in the battery 413. Otherwise, when the voltage drop does not occur, the BMS 411 may determine that the shutdown has not occurred in the battery 413. However, these values are merely exemplary, and other voltage values and time period values could be used.

Furthermore, when a discharge current is greater than a charge current after the first time period P1 of 20 seconds elapses from the first time point t1 at which the forced charge mode is entered, the BMS 411 may determine that shutdown has occurred in the battery 413. When the discharge current is less than the charge current, the BMS 411 may determine that the shutdown has not occurred in the battery 413.

As described above, when the voltage of the battery 413 drops by greater than or equal to the offset value with respect to the first voltage at the second time point t2, or when a discharge current is greater than a charge current at the second time point t2, the BMS 411 may determine that the shutdown has occurred in the battery 413. Furthermore, to increase the accuracy of determination, the BMS 411 may determine that the shutdown has occurred in the battery 413 when the voltage of the battery 413 drops by greater than or equal to the offset value with respect to the first voltage, and simultaneously the discharge current is greater than the charge current at the second time point t2.

When it is determined that the shutdown has occurred in the battery 413 at the second time point t2, the BMS 411 may control the power supply 410 to terminate the forced charge mode and enter a shutdown mode. When the power supply 410 enters the shutdown mode, a charge path and a discharge path are both shut off, and the battery 413 cannot be charged any longer.

Otherwise, when the shutdown has not occurred as a result of the first determination 551, the BMS 411 may control a charging operation to be continuously performed on the battery 413 during the second time period P2. After the charging operation is performed on the battery 413 during the second time period P2, the BMS 411 may determine whether the battery 413 exits an over-discharged state. When the battery 413 exits the over-discharged state, the BMS 411 may change the forced charge mode to a normal charge mode so that the charging operation may be continuously performed. Determination as to whether the battery 413 exits the over-discharged state based on a result of performing the charging operation on the battery 413 during the second time period P2 is hereinafter referred to as second determination 553.

In the above example, since the over-discharge protection voltage of one cell in the battery 413 is 3 V, the second voltage may be set to 3.3 V having a specific margin with respect to the over-discharge protection voltage of 3V. The BMS 411 determines whether a voltage of the battery 413 at the third time point t3 is greater than or equal to the second voltage, e.g., 3.3 V. When the voltage of the battery 413 is greater than or equal to the second voltage at the third time point t3 as a result of the determination, the BMS 411 may change the forced charge mode to the normal charge mode.

Furthermore, when the voltage of the battery 413 is less than the second voltage at the third time point t3, the BMS 411 may control the power supply 410 to enter a shutdown mode.

Even when the charging power is supplied to the battery 413 that is in an over-discharged state via the charger 540, the mobile X-ray apparatus 500 according to the embodiment determines, instead of performing a charging operation, whether the battery 413 is shut down via the first determination 551, subsequently determines whether the battery 413 exits an over-discharged state via the second determination 553, and controls the power supply 410 to enter a shutdown mode or a normal charge mode based on results of the first determination 551 and the second determination 553. Accordingly, the mobile X-ray apparatus 500 may prevent the possibility of additional damage to at least one of the battery 413, the system, and the charger 540 due to over-discharging or shutdown of the battery 413, thereby allowing stable charging of the battery 413.

Figure 6:
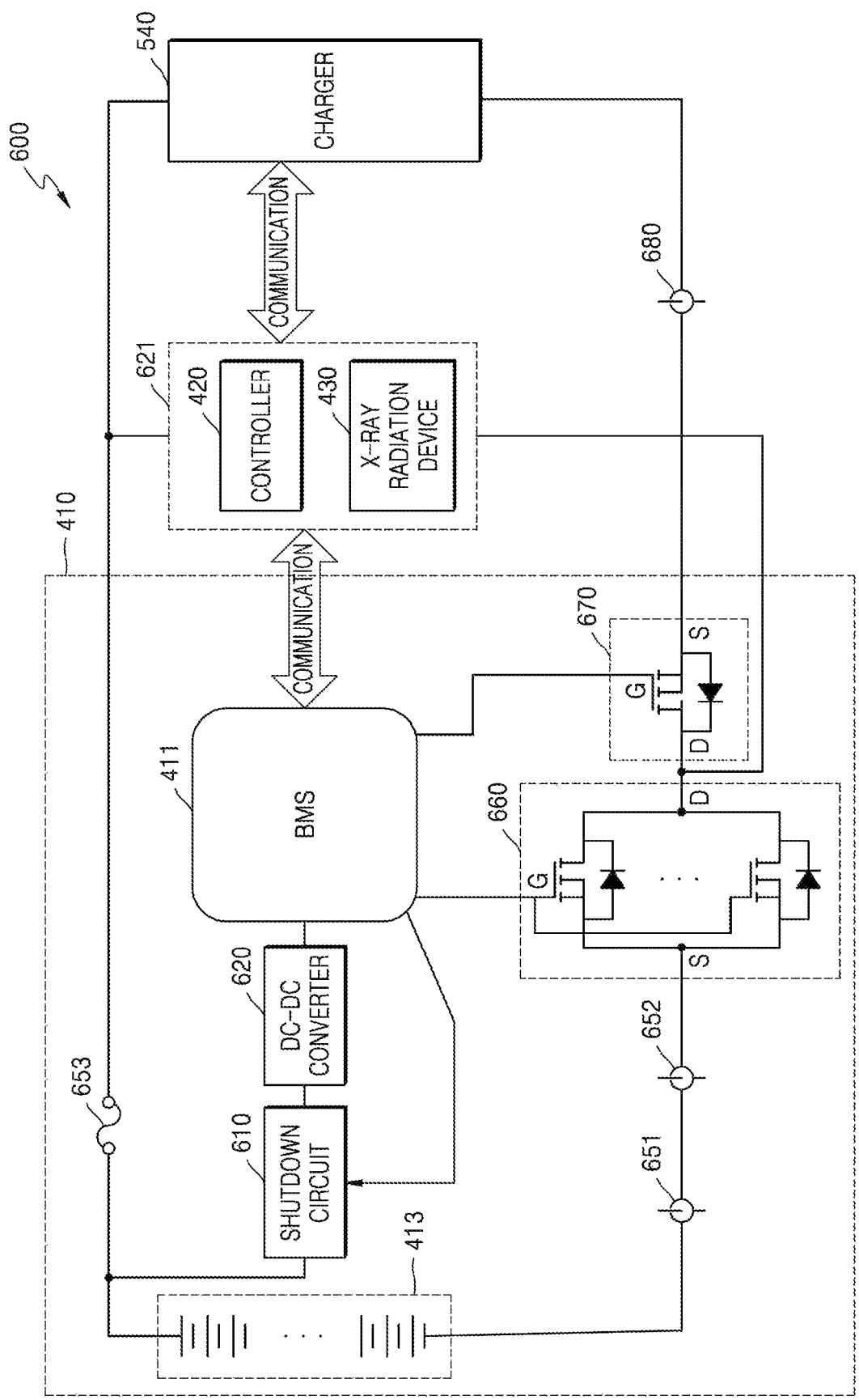
FIG. 6 is a detailed block diagram of a mobile X-ray apparatus according to another embodiment.

FIG. 6 is a detailed block diagram of a mobile X-ray apparatus 600 according to another embodiment. The mobile X-ray apparatus 600 of FIG. 6 may correspond to the mobile X-ray apparatus 500 described with reference to FIG. 5A. The same components of the mobile X-ray apparatus 600 as those of the mobile X-ray apparatus 500 shown in FIG. 5A are denoted by the same reference numerals. Thus, descriptions that are provided above with respect to the mobile X-ray apparatus 500 of FIG. 5A will be omitted here.

Referring to FIG. 6, the mobile X-ray apparatus 600 includes a power supply 410, a controller 420, an X-ray radiation device 430, and a charger 540.

In detail, the power supply 410 may include a battery 413, a BMS 411, a discharge FET 660, a charge FET 670, a shutdown circuit 610, a first current sensor 651, a second current sensor 652, a DC-to-DC (DC-DC) converter 620, and a fuse 653. The mobile X-ray apparatus 600 may further include a third current sensor 680. The first and second current sensors 651 and 652 may include a Hall sensor, and the shutdown circuit 610 that is a protection circuit may include a switching circuit such as a FET.

The BMS 411 may control a charge path and a discharge path via the charge FET 670 that is a charge controller and the discharge FET 660 that is a discharge controller. In other words, the BMS 411 may control on/off states of the charge FET 670 and the discharge FET 660 to manage a charge path and a discharge path. In this case, the charge path passing through the charge FET 670 is a path for connecting the charger 540 and the battery 413, and the battery 413 may receive a charging power from the charger 540 via the charge path. The discharge path passing through the discharge FET 660 is a path for supplying a power from the battery 413 to a system including the controller 420 and the X-ray radiation device 430.

The BMS 411 may communicate with the controller 420 via a communication interface to monitor a state of the power supply 410. Communication related to the state of the power supply 410 will be described in detail below with reference to FIG. 7.

The discharge FET 660 may include a plurality of FETs connected in parallel. Since an overcurrent may be transmitted to the X-ray radiation device 430 during X-ray emission by the X-ray radiation device 430 and damage the discharge path, the FETs having a specific capacity in the discharge FET 660 may be connected in parallel. In other words, by connecting the FETs in parallel, currents transmitted to the X-ray radiation device 430 are dispersed. For example, since an overcurrent greater than or equal to 300

A may flow within the power supply 410 during X-ray emission by the X-ray radiation device 430, the discharge FET 660 may be constituted by four (4) parallel connected FETs having a capacity of 600 A for protection against the overcurrent.

According to an embodiment, the discharge FET 660 and the charge FET 670 may each be constituted by an N-channel FET.

The discharge FET 660 and the charge FET 670 may control a path of discharge or charge current when the battery 413 is discharged or charged. According to an embodiment, when the battery 413 is discharged, the charge FET 670 may be turned off, and a discharge current loop may be formed by the discharge FET 660 that remains in an on state. In this case, the discharge current loop corresponds to the discharge path.

According to another embodiment, when the battery 413 is charged, the discharge FET 660 may be turned off, and a charge current loop may be formed by a body diode of the discharge FET 660 and the charge FET 670 that remains in an on state. In this case, the charge current loop corresponds to the charge path. Furthermore, the battery 413 may be discharged and charged at the same time via the discharge FET 660 and the charge FET 670.

As another example, the BMS 411 may sequentially control the discharge FET 660 and the charge FET 670 to thereby sequentially perform discharging and charging.

The BMS 411 may detect current of the battery 413 by using different current sensors, i.e., the first and second current sensors 651 and 652. In detail, the BMS 411 may detect current flowing in the battery 413 by using the first current sensor 651. The first current sensor 651 may be a small-capacity sensor for detecting a current having a relatively low intensity. In other words, the first current sensor 651 may be a sensor for detecting a current having an intensity less than or equal to a reference level. For example, the first current sensor 651 may be a sensor for detecting a current that is less than or equal to 50 A.

Furthermore, when an overcurrent flows in the battery 413, the BMS 411 may detect the overcurrent flowing in the battery 413 by using the second current sensor 652 since it is difficult to accurately detect the overcurrent via the first current sensor 651. The second current sensor 652 may be a large-capacity sensor for detecting a current having a relatively high intensity. In other words, the second current sensor 652 may be a sensor for detecting a current having an intensity greater than or equal to a reference level. For example, the second current sensor 652 may detect a current that is greater than or equal to 300 A. In this way, the first and second current sensors 651 and 652 may be configured to detect currents having different intensities. For example, the second current sensor 652 may detect a current that is higher than that detected by the first current sensor 651.

According to an embodiment, the BMS 411 may detect, via the first current sensor 651, a current flowing in the battery 413 by activating the first current sensor 651 while deactivating the second current sensor 652. Then, when the X-ray radiation device 430 emits X-rays, the BMS 411 may detect an overcurrent that occurs during the X-ray emission via the second current sensor 652 by activating the second current sensor 652 while deactivating the first current sensor 651. Subsequently, when the X-ray emission is completed, the BMS 411 may detect, via the first current sensor 651, a current flowing in the battery 413 by activating the first current sensor 651 while deactivating the second current sensor 652.

According to another embodiment, when the X-ray radiation device 430 emits X-rays, the BMS 411 may detect an overcurrent by activating the second current sensor 652. In this case, the BMS 411 may also activate the first current sensor 651, but may ignore a signal received from the first current sensor 651. Subsequently, when the X-ray emission is completed, the second current sensor 652 may be deactivated.

According to another embodiment, regardless of whether X-ray emission is performed, the first and second current sensors 651 and 652 may remain in an on state. In this case, the BMS 411 may selectively use signals received from the first and second current sensors 651 and 652 depending on whether the X-ray emission is performed. For example, the BMS 411 may control the power supply 410 based on a signal transmitted from the first current sensor 651 before receiving an X-ray emission preparation signal and after receiving an X-ray emission completion signal. Furthermore, the BMS 411 may control the power supply 410 based on a signal transmitted from the second current sensor 652 during a time period between reception of the X-ray emission preparation signal and reception of the X-ray emission completion signal.

The BMS 411 may check the residual amount of the battery 413 based on the amount of current detected using the first and second current sensors 651 and 652. In detail, the BMS 411 may use Coulomb Counting Based Gauging to check the residual amount of the battery 413 based on the detected amount of current.

Furthermore, the mobile X-ray apparatus 600 may further include the third current sensor 680 for measuring a charge current. In other words, the mobile X-ray apparatus 600 may further include the third current sensor 680 at an output terminal of the charger 540. When the battery 413 is charged and discharged at the same time, current measured by the first or second current sensor 651 or 652 may be a sum of a discharge current and a charge current. Thus, to accurately measure a discharge current and a charge current, the mobile X-ray apparatus 600 may measure the charge current by using the third current sensor 680.

The BMS 411 may turn itself off by using the shutdown circuit 610. When the BMS 411 checks a state of the battery 413 to detect hazardous conditions such as over-discharge and overcharge, the BMS 411 may turn itself off by using the shutdown circuit 610 that serves as a protection circuit. When the BMS 411 is turned off, supply of current via the charge path and the discharge path may be stopped as the charge controller and the discharge controller are turned off. Power being supplied to the controller 420 may also be cut off, so that the controller 420 may turn off.

The fuse 653 is designed to stop continuous flowing of excessive current that is greater than a nominal value in the power supply 410 and may protect a battery cell when the battery 413 is subjected to an external short circuit.

The DC-DC converter 620 may convert a voltage of the battery 413 into a DC power for an operating power of the BMS 411.

Furthermore, while FIG. 6 shows that a load 621 receiving a power from the battery 413 via the charge path and/or discharge path includes the controller 420 and the X-ray radiation device 430, the load 621 may further include other components of the mobile X-ray apparatus 600 that require power. For example, the load 621 may include a high voltage generator, a motor driver for moving the mobile X-ray apparatus 600, etc.

FIG. 7 is a diagram for explaining a communication protocol used in the mobile X-ray apparatus (500 of FIG. 5A), according to an embodiment.

Components included in the mobile X-ray apparatus 500 may communicate with one another via communication interfaces that comply with a predetermined communication standard. For example, the power supply 410, the controller 420, and the charger 540 may communicate with one another via communication interfaces 710 according to a CAN protocol.

Referring to FIG. 7, the power supply 410 and the controller 420 may exchange data related to an operation state of the power supply 410 via the communication interfaces 710 according to the CAN protocol.

In detail, the BMS 411 may transmit data 720 indicating an operation state of the power supply 410 to the controller 420.

For example, the power supply 410 may transmit the data 720 indicating entry into a forced charge mode to the controller 420. In this case, the transmitted data 720 may be a 'forced charge bit' formed by a CAN byte according to the CAN protocol and may have an active or inactive state. The data 720 may be composed of one bit having a binary value. When a binary value '0' represents an active state, '1' may represent an inactive state. Alternatively, when a binary value '1' represents an active state, '0' may represent an inactive state. For example, when binary values '0' and '1' of data formed by a CAN byte represent an active state and an inactive state, respectively, the power supply 410 may transmit the data 720 carrying a forced charge bit having a value of '0' to the controller 420 when the battery 413 enters a forced charge mode. According to an embodiment, when the power supply 410 enters the forced charge mode at the first time point (t1 of FIG. 5C), the BMS 411 may set the data 720 including a forced charge bit to have a value indicating an active state and transmit the data 720 carrying the forced charge bit having an active state to the controller 420. By receiving the data 720, the controller 420 may recognize that the power supply 410 has entered the forced charge mode. Furthermore, the controller 420 may output information indicating entry into the forced charge mode via the output device 570.

Figure 8:
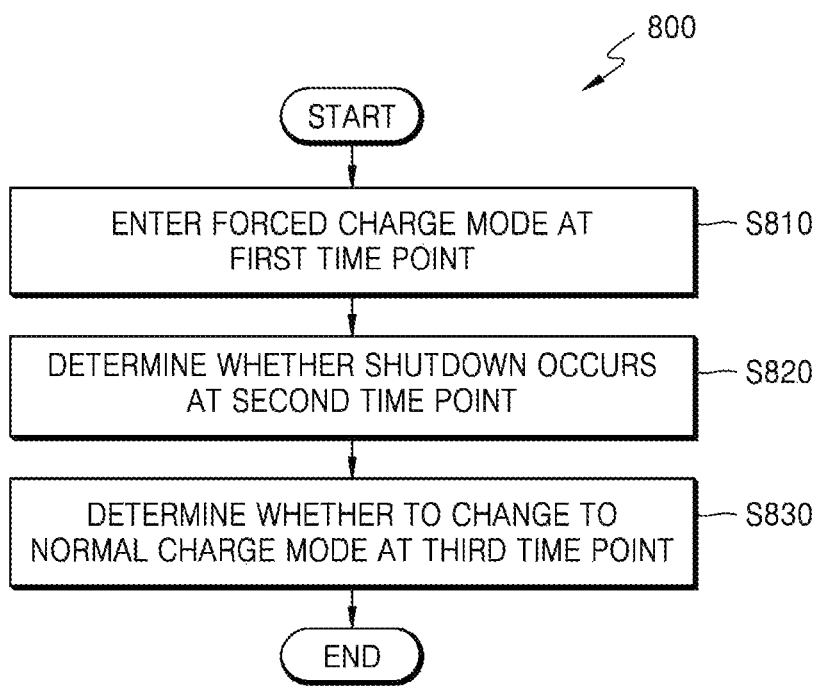
FIG. 8 is a flowchart of a power control method performed by a mobile X-ray apparatus, according to an embodiment.

FIG. 8 is a flowchart of a power control method 800 performed by a mobile X-ray apparatus, according to an embodiment. Operations included in the power control method 800 of FIG. 8 are the same as operations of the mobile X-ray apparatus 400, 500 or 600 according to the embodiments described with reference to FIGS. 1 through 7. Thus, descriptions that are provided above with respect to FIGS. 1 through 7 will be omitted below.

The power control method 800 is a method performed by a mobile X-ray apparatus including a power supply equipped with a battery and a BMS to supply an operating power.

In detail, according to the power control method 800, a forced charge mode for the battery 413 is entered at first time point t1 (S810). Operation S810 may be performed by the power supply 410 according to control by the BMS 411.

It is determined whether shutdown occurs in the battery 413 at second time point t2 that occurs first time period P1 after first time point t1 (S820). Operation S820 may be performed by the BMS 411 and corresponds to the first determination 551 described with reference to FIG. 5C.

When the shutdown does not occur as a result of the determining in operation S820, it is determined whether to change the forced charge mode to a normal charge mode, based on a voltage of the battery 413 at third time point t3 that occurs second time period P2 after second time point t2 (S830). Operation S830 may be performed by the BMS 411 and corresponds to the second determination 553 described with reference to FIG. 5C.

Figure 9:
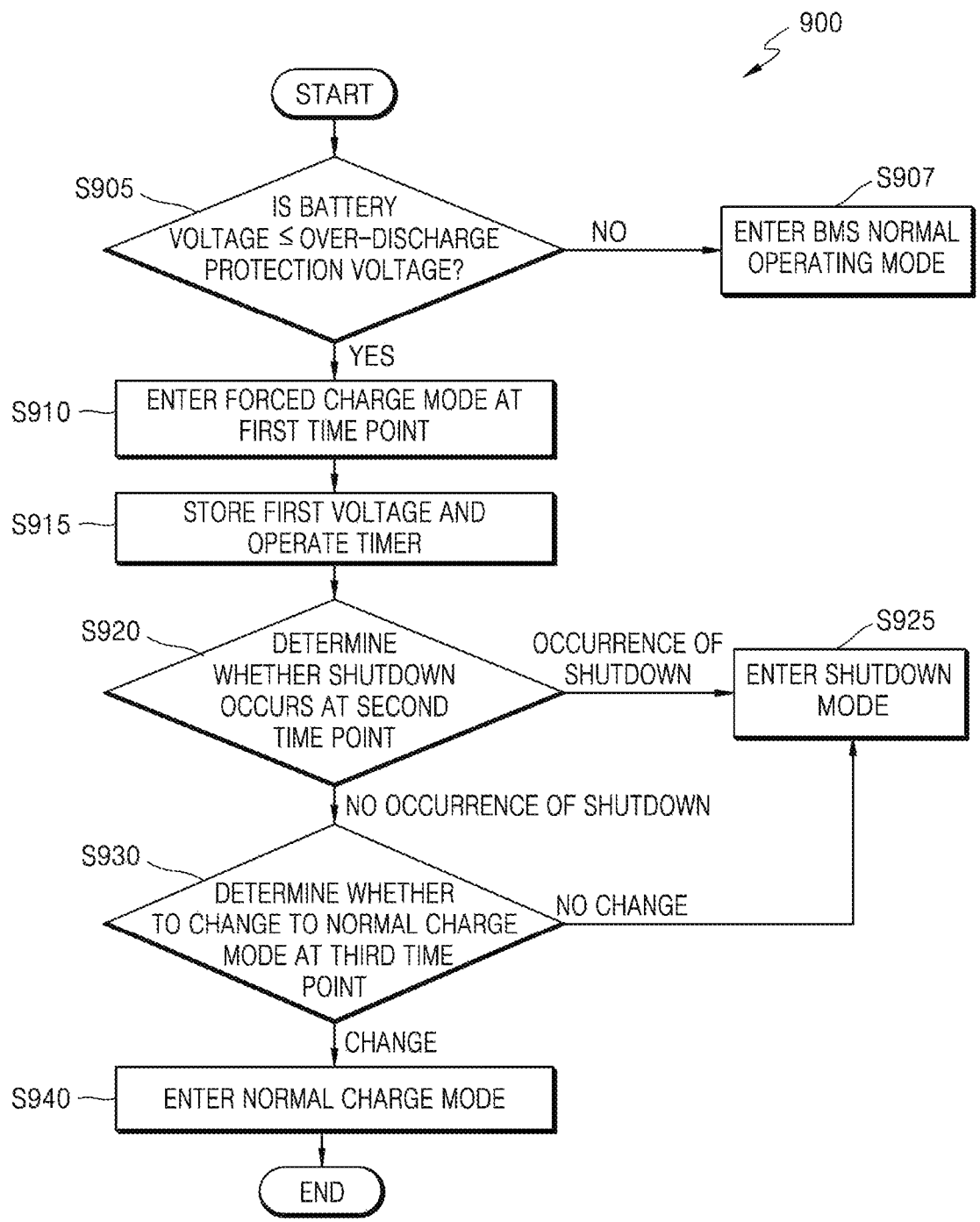
FIG. 9 is a flowchart of a power control method performed by a mobile X-ray apparatus, according to another embodiment.

FIG. 9 is a flowchart of a power control method 900 performed by a mobile X-ray apparatus, according to another embodiment. Operations included in the power control method 900 of FIG. 9 are the same as operations of the mobile X-ray apparatus 400, 500 or 600 according to the embodiments described with reference to FIGS. 1 through 7. Thus, descriptions that are provided above with respect to FIGS. 1 through 7 will be omitted below. Furthermore, since operations S910, S920, and S930 of the power control method 900 respectively correspond to operations S810, S820, and S830 included in the power control method 800, descriptions that are provided above with respect to FIG. 8 will be omitted herein.

Referring to FIG. 9, according to the power control method 900, it is determined whether a voltage of the battery 413 corresponds to an over-discharge protection voltage (S905). Operation S905 may be performed by the BMS 411.

In detail, it may be determined whether the voltage of the battery 413 (the 'first voltage') is less than or equal to an over-discharge protection voltage level at the first time point t1 when a charging power is supplied. When the voltage of the battery 413 exceeds the over-discharge protection voltage level, a normal charge mode that is a normal operating mode is entered (S907). Otherwise, when the voltage of the battery 413 is less than or equal to the over-discharge protection voltage level, operation S910 is performed.

When the voltage of the battery 413 is less than or equal to the over-discharge protection voltage level at the first time point t1 and a charging power is supplied to the battery 413, a forced charge mode is entered at the first time point t1 (S910).

The first voltage is stored, and a timer starts to be operated at the first time point t1 to measure the time from the first time point t1 (S915). Operation S915 may be performed by the BMS 411.

Then, it is determined whether a shutdown occurs in the battery 413 at second time point t2 that occurs first time period P1 after the first time point t1 (S920). Operation S920 may be performed by the BMS 411.

When the shutdown occurs in the battery 413 as a result of the determining in operation S920, a shutdown mode is entered (S925). Operation S925 may be performed by the power supply 410 according to control by the BMS 411.

When the shutdown does not occur as a result of the determining in operation S920, it is determined whether to change the forced charge mode to a normal charge mode, based on a voltage of the battery 413 at third time point t3 that occurs second time period P2 after the second time point t2 (S930).

When the shutdown occurs in the battery 413 based on the voltage of the battery 413 at the third time point t3 as a result of the determining in operation S930, the shutdown mode is entered (S925).

Otherwise, when the shutdown does not occur in the battery 413 based on the voltage of the battery 413 at the third time point t3 as a result of the determining in operation S930, so that the voltage of the battery 413 exceeds the over-discharge protection voltage level, a normal charge mode is entered (S940). Operation S940 may be performed by the power supply 410 according to control by the BMS 411.

According to the embodiments, a mobile X-ray apparatus and a method of controlling power in the mobile X-ray apparatus do not perform an unconditional charging operation even if a charging power is supplied to a battery through a charger when the battery is in an over-discharged state.

In other words, according to the embodiments, the mobile X-ray apparatus determines whether a battery is shut down when in a forced charge mode, subsequently determines whether the battery exits an over-discharged state, and then controls a power supply to enter a shutdown mode or a normal charge mode according to results of the determining. Thus, it is possible to prevent additional damage from occurring to at least one of a battery, a system, and a charger due to over-discharging or shutdown of the battery, thereby allowing safe charging of the battery.

Embodiments may be implemented through a non-transitory computer-readable recording media having recorded thereon computer-executable instructions and data. The instructions may be stored in the form of program codes, and when executed by a processor, generate a predetermined program module to perform a specific operation. Furthermore, when being executed by the processor, the instructions may perform specific operations according to the embodiments.

While one or more embodiments have been described with reference to the figures, it will be understood by those of ordinary skill in the art that various changes in form and details may be made therein without departing from the spirit and scope of the present disclosure as defined by the following claims. Accordingly, the above embodiments and all aspects thereof are examples only and are not limiting.

What is claimed is:

1. A mobile X-ray apparatus including a power supply configured to supply an operating power, the power supply comprising:
    a battery; and
    a battery management system configured to:
        determine whether the battery is in a state corresponding to a shutdown at a second time point that occurs a first time period after a first time point at which the power supply enters a first charge mode, and
        determine, in response to the battery not being in the state corresponding to the shutdown at the second time point, whether to change the first charge mode to a second charge mode, based on a voltage of the battery at a third time point that occurs a second time period after the second time point.

2. The mobile X-ray apparatus of claim 1, wherein the battery management system is further configured to:
    determine whether the voltage of the battery at the third time point is greater than or equal to a second voltage that is greater than a first voltage that is a voltage of the battery at the first time point, and
    change, in response to the voltage of the battery at the third time point being greater than or equal to the second voltage, the first charge mode to the second charge mode.

3. The mobile X-ray apparatus of claim 2, wherein the battery management system is further configured to control the power supply to enter a shutdown mode when the voltage of the battery at the third time point is less than the second voltage.

4. The mobile X-ray apparatus of claim 1, wherein the battery management system is further configured to measure a first voltage that is a voltage of the battery at the first time point and measure a time from when the power supply enters the first charge mode.

5. The mobile X-ray apparatus of claim 4, wherein the battery management system is further configured to determine whether the shutdown occurs, based on the first voltage and the measured time.

6. The mobile X-ray apparatus of claim 5, wherein the battery management system is further configured to determine that the battery is in the state corresponding to the shutdown when a voltage of the battery at the second time point drops by greater than or equal to an offset value with respect to the first voltage.

7. The mobile X-ray apparatus of claim 5, wherein the battery management system is further configured to determine that the battery is in the state corresponding to the shutdown occurs when a discharge current flowing from the battery is greater than a charge current flowing to the battery at the second time point.

8. The mobile X-ray apparatus of claim 1, wherein the battery management system is further configured to control the power supply to enter the first charge mode when charging power is supplied to the mobile X-ray apparatus while a voltage of the battery corresponds to a voltage in an over-discharge mode.

9. The mobile X-ray apparatus of claim 1, wherein the battery management system is further configured to control the power supply to terminate the first charge mode and enter a shutdown mode when it is determined that the battery is in the state corresponding to the shutdown at the second time point.

10. The mobile X-ray apparatus of claim 1, wherein the battery management system is further configured to transmit data indicating that the power supply enters the first charge mode to a controller.

11. The mobile X-ray apparatus of claim 1, further comprising:
    an X-ray radiation device; and
    a controller configured to control the X-ray radiation device.

12. The mobile X-ray apparatus of claim 11, further comprising a communication interface configured to connect the power supply to the controller,
    wherein the battery management system is further configured to transmit, in response to the power supply entering the first charge mode, data including a forced charge bit having a value indicating an active state to the controller via the communication interface.

13. A power control method performed by a mobile X-ray apparatus including a power supply that has a battery and a battery management system and is configured to supply an operating power, the power control method comprising:
    entering a first charge mode for the battery at a first time point;
    determining that the battery is in a state corresponding to a shutdown at a second time point that occurs a first time period after the first time point; and
    in response to the battery not being in the state corresponding to the shutdown at the second time point, determining whether to change the first charge mode to a second charge mode, based on a voltage of the battery at a third time point that occurs a second time period after the second time point.

14. The power control method of claim 13, wherein the determining whether to change the first charge mode to the second charge mode further comprises determining whether the voltage of the battery at the third time point is greater than or equal to a second voltage that is greater than a first voltage that is a voltage of the battery at the first time point.

15. The power control method of claim 14, wherein the determining whether to change the first charge mode to the second charge mode further comprises:
- changing, in response to the voltage of the battery at the third time point being greater than or equal to the second voltage, the first charge mode to the second charge mode; and
- controlling the power supply to enter a shutdown mode when the voltage of the battery at the third time point is less than the second voltage.

16. The power control method of claim 13, wherein the determining whether the battery is in the state corresponding to the shutdown comprises:
- measuring a first voltage that is a voltage of the battery at the first time point and measuring a time from in response to the power supply entering the first charge mode; and
- determining whether the battery is in the state corresponding to the shutdown based on the first voltage and the measured time.

17. The power control method of claim 16, wherein the determining whether the battery is in the state corresponding to the shutdown further comprises determining that the battery is in the state corresponding to the shutdown when a voltage of the battery at the second time point drops by greater than or equal to an offset value with respect to the first voltage.

18. The power control method of claim 16, wherein the determining whether the battery is in the state corresponding to the shutdown further comprises determining that the battery is in the state corresponding to the shutdown when a discharge current flowing from the battery is greater than a charge current flowing to the battery at the second time point.

19. The power control method of claim 13, wherein the determining whether the battery is in the state corresponding to the shutdown comprises controlling the power supply to terminate the first charge mode and enter a shutdown mode when it is determined that the battery is in the state corresponding to the shutdown at the second time point.

20. A non-transitory computer-readable recording medium having recorded thereon a program including computer-executable instructions for performing a power control method, performed by a mobile X-ray apparatus including a power supply that has a battery and a battery management system and is configured to supply an operating power, the power control method comprising:
- entering a first charge mode for the battery at a first time point;
- determining that the battery is in a state corresponding to a at a second time point that occurs a first time period after the first time point; and
- in response to the battery not being in the state corresponding to the shutdown at the second time point, determining whether to change the first charge mode to a second charge mode, based on a voltage of the battery at a third time point that occurs a second time period after the second time point.

* * * * *